June 11, 1957     H. L. STICHLER ET AL     2,795,392
LOCK VALVE
Filed July 14, 1953                         2 Sheets-Sheet 1
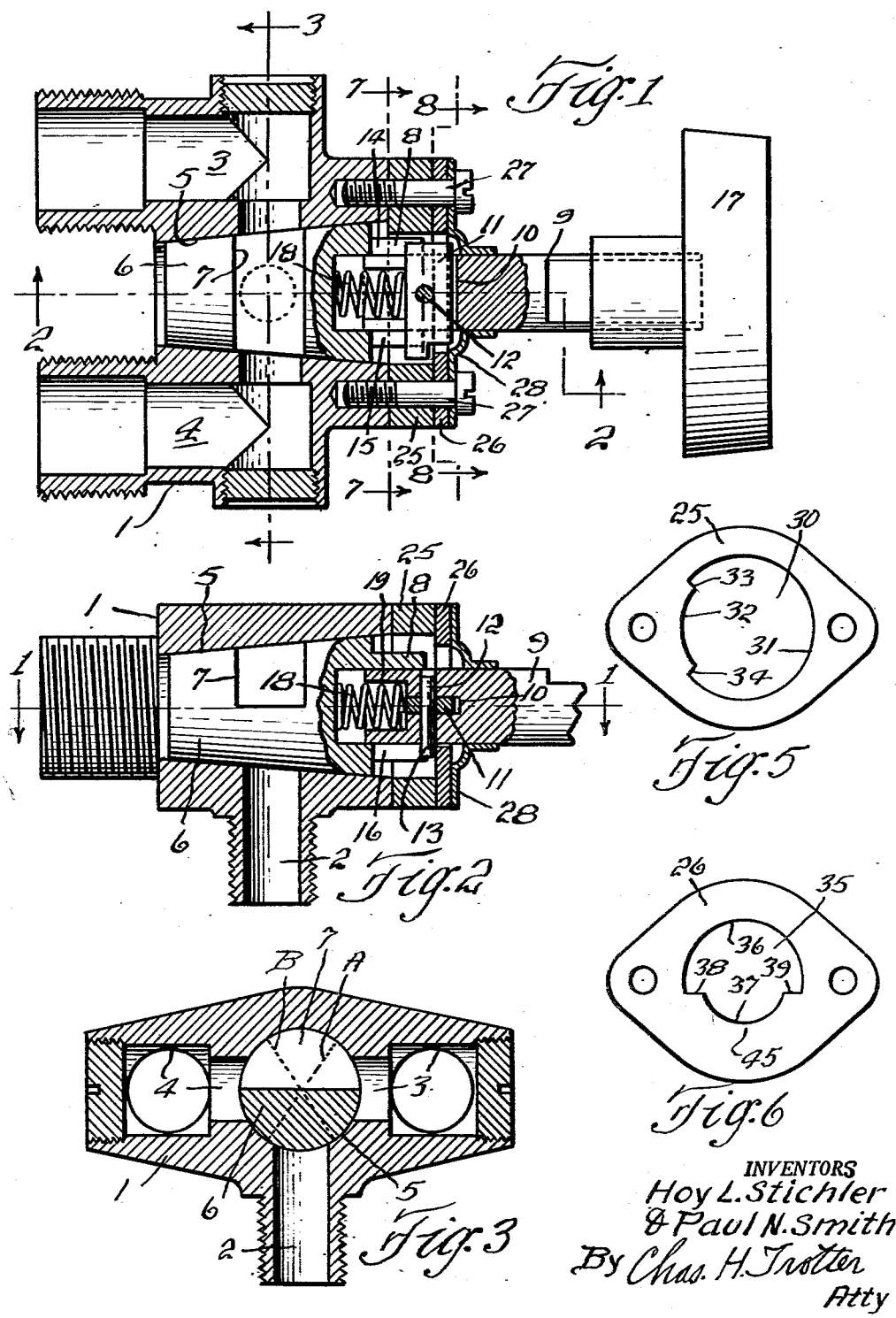
INVENTORS
Hoy L. Stichler
& Paul N. Smith
By Chas. H. Trotter
Atty June 11, 1957    H. L. STICHLER ET AL    2,795,392
LOCK VALVE
Filed July 14, 1953    2 Sheets-Sheet 2
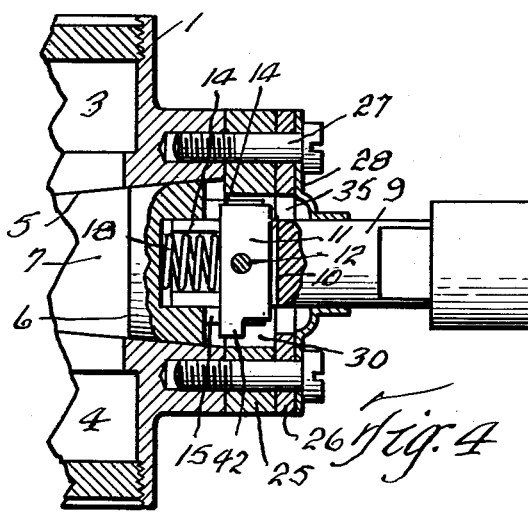
Fig. 4
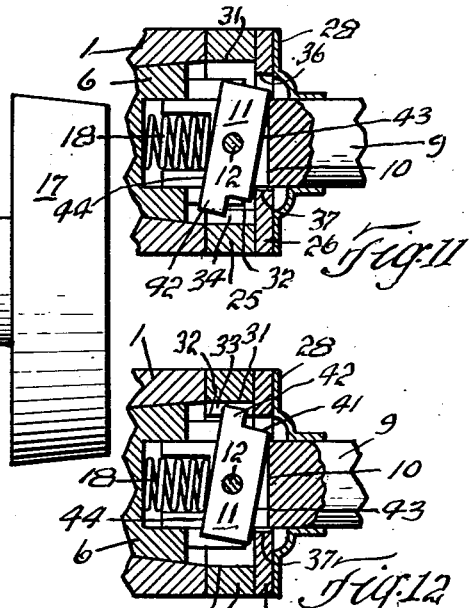
Fig. 11
Fig. 12
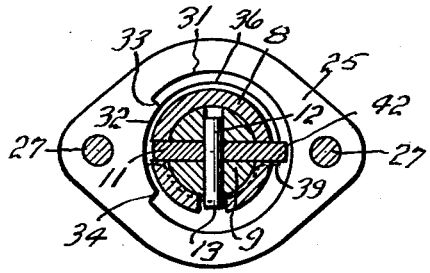
Fig. 7
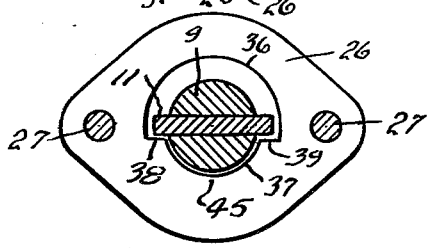
Fig. 8
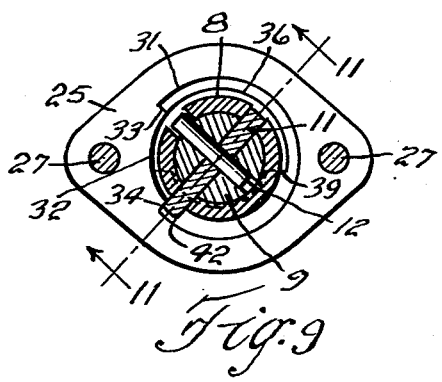
Fig. 9
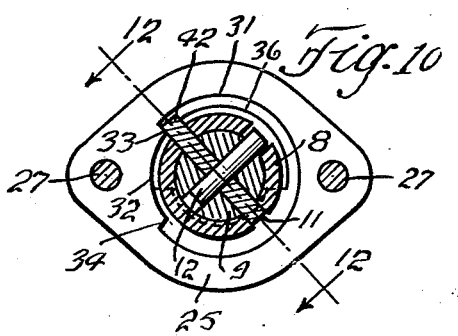
Fig. 10
INVENTORS
Hoy L. Stichler
& Paul N. Smith
By Chas. H. Trotter
Atty.

United States Patent Office 2,795,392
Patented June 11, 1957

2,795,392
LOCK VALVE

Hoy L. Stichler and Paul N. Smith, Mansfield, Ohio, assignors to The Tappan Stove Company, Mansfield, Ohio, a corporation of Ohio Application July 14, 1953, Serial No. 367,834

9 Claims. (Cl. 251—97)

This invention relates generally to valves of the type which automatically lock in closed position and in which the valve stem must be depressed to unlock it before the valve can be turned from closed position to open position. More specifically the invention relates to locking means for three-way valves having one closed position and two open positions and which are operative when in one open position to direct the flow of fluid out through one passageway and when in the other open position to direct the flow of fluid out through another passageway.

The invention is especially adapted for incorportion in three-way valves such as are used to control the flow of gas to cooking range burners of the compound type. Burners of this type generally comprise a relatively large high heat cooking section and a relative small low heat simmer section which is principally used to keep food warm after it has been cooked. The two sections are built into a single burner head, and each section is supplied with gas through a separate mixing tube. The valve used to control the operation of the burner can be selectively set to direct gas to either the cooking section or the simmer section or to cut off the supply of gas to both sections. The valve is locked in closed position and must be unlocked before it can be turned to open position.

Three-way valves which lock in closed position and in which the valve stem must be depressed to unlock it before turning it to either on position are old and well known. But prior to our invention when turning valves of the type from one open position to closed position they would frequently turn past closed position to the other open position. This is especially true when the valve is quickly turned from either open position towards the closed position. With a locking mechanism constructed according to our invention such an action is impossible for according to our invention whenever the valve is turned to either open position the locking member is automatically set in such a position that the valve will always lock when it reaches closed position as it is turned from either open position.

Our improved lock valve mechanism comprises generally a valve casing having an inlet port, two outlet ports and a frusto conical rotary plug by which the flow of gas through the valve is controlled. The larger end of the plug has an outwardly extending axial tubular sleeve formed integrally therewith in which the inner end of the valve stem is slidably mounted. A compression spring disposed in the tubular sleeve yieldingly biases the stem outwardly and the plug inwardly. The inner end of the valve stem has a medial slot therethrough in which a flat key is pivotally mounted. The key extends out from each side of the valve stem and into longitudinal slots in the tubular sleeve to provide a driving connection between the valve stem and the plug. The key also functions, in combination with various abutments carried by a pair of apertured disks which are secured to the valve casing around the valve stem and tubular sleeve, to limit the rotation of the plug to either open position and to lock it in closed position.

The principal object of the invention is to provide a simple and efficient locking mechanism for a three-way valve which is so constructed and arranged that the valve cannot be turned from one open position past closed position to the other open position without first locking in closed position when it reaches closed position.

Other and more limited objects of the invention will be apparent from the following specification and the accompanying drawings forming a part thereof wherein:

Fig. 1 is a horizontal section through a three-way valve embodying our invention showing it in closed position, the plane of the section being indicated by the line 1—1 on Fig. 2;

Fig. 2 is a central vertical section taken on the line 2—2 of Fig. 1;

Fig. 3 is a transverse vertical section taken on the line 3—3 of Fig. 1;

Fig. 4 is a view similar to Fig. 1 showing the valve stem in depressed unlocked position preparatory to turning the valve to either of the open positions;

Fig. 5 is a face view of a disk which is operative to limit the movement of the valve to either open position;

Fig. 6 is a face view of a disk which is operative to lock the valve in closed position;

Fig. 7 is a transverse vertical section taken on the line 7—7 on Fig. 1;

Fig. 8 is a transverse vertical section taken on the line 8—8 on Fig. 1;

Fig. 9 is a view similar to Fig. 7 showing the mechanism in one open position;

Fig. 10 is a view similar to Fig. 7 showing the mechanism in the other open position;

Fig. 11 is a section taken on the line 11—11 on Fig. 9; and

Fig. 12 is a section taken on the line 12—12 on Fig. 10.

Referring now to the drawings by reference character the numeral 1 indicates a valve casing having an inlet passageway 2, two outlet passageways 3 and 4, and a central frusto conical bore 5 which intersects the passageways 2, 3 and 4. A complementary frustoconical plug 6 having the transverse slot 7 therein is rotatably mounted in the bore 5 and is operative to control the flow of fluid from the inlet passageway 2 to the outlet passageways 3 and 4. When the plug 5 is in the position shown in full lines in Fig. 3 the inlet passageway 2 is cut off from both of the passageways 3 and 4, when the plug is turned to the position indicated by the dotted line A in Fig. 3 the inlet passageways 2 is in communication with the outlet passageway 3, and when the plug is turned to the position indicated by the dotted line B in Fig. 3 the inlet passageway 2 is in communication with the outlet passageway 4.

The plug 6 has an outwardly extending axial tubular extension 8 formed integrally therewith in which the inner end of a valve stem 9 is slidably mounted. The inner end of the valve stem is transversely slotted as indicated at 10 and has a flat key 11 pivotally secured therein by a pivot pin 12 one end of which extends out beyond the surface of the valve stem 9 as shown at 13. The ends of the key 11 extend out from the valve stem 9 and into diametrically opposed slots 14 and 15 in the tubular extension 8, and the projecting end 13 of the pin 12 extends into a slot 16 in the extension 8 midway between the opposed slots 14 and 15. The key 12 and end 13 of the pin 12 thus form a slidable driving connection between the plug 6 and the valve stem 9 through which the plug 6 is rotated by the valve stem 9. A handle 17 by which the valve stem 9 is rotated is removably secured to the outer end of the valve stem 9. A coiled compression spring 18 which is disposed within the tubular extension 8 and extends into a bore 19 in the inner end of the valve stem 9 is provided to yieldingly bias the valve stem 9 outwardly and to urge the plug 6 into its bore 5.

Means to lock the plug 6 in closed position and to limit the rotation thereof to either open position is provided which will now be described. This means comprises two apertured disks 25 and 26 having various abutments or stops which cooperate with the key 11 in accomplishing these results. The disks 25 and 26 are secured to the front of the casing 1 about the valve stem 9 and tubular extension 8 by a pair of bolts 27 which also secure a cap 28 in place. The disk 25 which is about three times the thickness of the disk 26 abuts the casing 1 and the disk 26 is disposed between the disk 25 and the cap 28. The disk 25 has an aperture 30 therethrough which is defined by two concentric arcuate edges 31 and 32 of different radii which are connected together by the radially disposed shoulders 33 and 34 which constitute stops or abutments. The edge 32 is of smaller radius than the edge 31 and extends through approximately 90° whereas the edge 31 of greater radius extends through approximately 270°. The disk 26 has a central aperture 35 therethrough which is defined by two concentric arcuate edges 36 and 37 of different radii which are connected together by the aligned shoulders 38 and 39 which also constitute stops or abutments. The radius of the edge 36 is the same as the radius of the edge 32 in the disk 25, and the radius of the edge 37 is just slightly greater than the radius of the valve stem 9.

One end of key 11 is notched out as shown at 41 to provide an extending tongue 42 of lesser width than the balance of the key. The length of the outer side 43 on each side of the pivot pin 12 is the same, being slightly less than the radius of the edge 32 in the disk 25 and the edge 36 in the disk 26; and the length of the inner side 44 of the key is longer than the side 43 by the length of the tongue 42. The length of the tongue end of the side 44 is slightly less than the radius of the edge 31 in the disk 25 and slightly greater than the edges 32 and 36 in the disks 25 and 26 respectively, and the length of the other end of the side 44 is the same as the corresponding end of the side 43.

When the valve is in closed position, with the plug 6 in the position shown in full lines in Fig. 3, the outer side 43 of the key 11 is disposed in the recess 35 in the lock disk 26 and the inner side 44 of the key 11 is disposed within the recess 30 in the stop disk 25 as shown in Figs. 1, 2, 7 and 8. In this position the face of the key 11 at one end thereof will engage the shoulder 38 and prevent the turning of the valve stem 9 and plug 6 in a clockwise direction (Figs. 1 and 2) to establish communication between the inlet passageway 2 and the outlet passageway 4. The spring 18 yieldingly holds the valve stem 9 and key 11 in this position and the engagement of the projecting end 13 of the pivot pin 12 with a cam section 45 of the disk 26 adjacent the edge 37 between the shoulders 38 and 39 limits the outward movement of the stem 9 and key 11.

In order to turn the plug 6 to either open position the valve stem 9 must first be depressed or pushed inwardly from the position shown in Fig. 1 to the position shown in Fig. 4. In this position the key 11 is disposed wholly within the aperture 30 in the disk 25 and the spring 18 yieldingly holds the key 11 perpendicular to the axis of the valve stem 9. The valve stem 9 and plug 6 can then be turned in either direction until the tongue 42 engages either the shoulder 33 or 34 in the stop disk 25. When turned counterclockwise (Figs. 1 and 2) from the position shown in Fig. 7 to the position shown in Fig. 9 to establish communication between the inlet passageway 2 and the outlet passageway 4 the tongue 42 will engage the shoulder 34 to limit the opening movement of the plug 6 in this direction; and when turned clockwise to establish communication between the inlet passageway 2 and the outlet passageway 3 the tongue 42 will engage the shoulder 33 to limit the opening movement of the plug 6 in this direction. When the valve stem 9 has been turned counterclockwise from the closed position shown in Fig. 7 to the open position shown in Fig. 9 the outer side 43 of the key 11 adjacent the notch 41 extends out over the section 45 of the disk 26 as shown in Fig. 11; and when the valve stem 9 has been turned clockwise from the closed position shown in Fig. 7 to the open position shown in Fig. 10 the outer side 43 of the key 11 opposite the notch 41 will extend out over the section 45 of the disk 26 as shown in Fig. 12. As soon as the handle 17 is released with the valve stem in the open position shown in Fig. 9 the spring 18 will force the valve stem 9 outwardly and the engagement of the outer side 43 of the key 11 adjacent the notch 41 with the section 45 of the disk 26 will cock the key 11 from the position shown in Fig. 4 to the position shown in Fig. 11 as the valve stem is forced outwardly by the spring 18. In this position the outer side 43 of the key 11 opposite the notch 41 is disposed within the aperture 35 in the disk 26 in alignment with the shoulders 38 and 39. Then, when the valve stem and plug are turned clockwise back to closed position the end of the key 11 within the aperture 35 will engage the shoulder 38 as soon as the valve stem reaches closed position and stop further rotation thereof after which the spring 18 will force the valve stem still further outwardly and return the key back perpendicularly to the axis of the valve stem 9, it being understood that as the valve stem and key reach closed position the key will ride off the surface 45. The valve stem must then be depressed as described before the valve can again be turned to either open position. After the valve stem has been turned to the other open position, as shown in Fig. 10, and released, the key 11 will assume the position shown in Fig. 12, and will engage the shoulder 39 when the valve stem is turned back from this open position to closed position.

From the foregoing it will be seen that as soon as the valve has been turned to either open position and released the key 11 will immediately assume such a position that one end thereof is in alignment with the stops 38 and 39 which assures that the valves cannot be turned from one open past closed position to the other open position without first stopping and locking in closed position; and it will be apparent to those skilled in this art that we have provided a very simple and efficient mechanism for accomplishing the objects of the invention.

It is to be understood that we are not limited to the specific construction shown and described herein as various modifications may be made therein within the scope of the appended claims.

What is claimed is:

1. A rotary valve mechanism having a closed position and two open positions and comprising a casing having an inlet passageway and two outlet passageways therein, a plug rotatably mounted in said casing and operative in one open position to connect said inlet passageway with one of said outlet passageways and in the other open position to connect said inlet passageway with the other of said outlet passageways and in closed position to cut off said inlet passageway from both of said outlet passageways, an outwardly extending axial tubular extenion of lesser outside diameter than the diameter of the outer end of said plug carried by said plug, a pair of diametrically opposite longitudinal slots in said tubular extension, a depressible valve stem having the inner end thereof slidably mounted in said tubular extension, a spring disposed in said tubular extension and operative to yieldingly bias said valve stem outwardly, a transverse medial slot through said valve stem at the inner end thereof, a key pivotally mounted in said medial slot and extending outwardly from opposite sides of said valve stem and into said diametrically opposite slots in said tubular extension to provide a slidable driving connection between said valve stem and said plug with one end of said key extending outwardly beyond the outer wall of said tubular extension, a stop disk having an aperture therethrough and a pair of spaced radially extending shoulders extending into said apertures secured to said casing about said valve stem and tubular extension, a locking disk having an aperture therethrough and a pair of aligned shoulders therein secured to said casing about said valve stem and in contact with the outer face of said stop disk, said key cooperating with said radially extending shoulders to limit the rotation of said plug to open positions and with said aligned shoulders to lock said plug in closed position.

2. A rotary valve mechanism as defined in claim 1 in which the aperture through said stop disk is defined by two concentric arcuate edges of different radii which are connected together by said radially extending shoulders, and in which the aperture through said locking disk is defined by two concentric arcuate edges of different radii which are connected together by said aligned shoulders.

3. A rotary valve mechanism as defined in claim 2 in which the radius of the arcuate edge of larger radius in said locking disk is substantially the same as the radius of the arcuate edge of smaller radius in said stop disk, and in which the radius of the arcuate edge of smaller radius in said locking disk is substantially the same as the radius of said valve stem.

4. A rotary valve mechanism as defined in claim 3 in which the length of the outer side of said key on each side of the pivotal axis of said key is less than the radius of the arcuate edge of larger radius in said locking disk and is greater than the radius of the arcuate edge of smaller radius in said locking disk, and in which the length of the inner side of said key on one side of the pivoted axis thereof is the same length as the length of the opposing end of the outer side of said key and the length of the inner side of said key on the opposite side of the pivoted axis thereof is longer than the radius of the arcuate edge of larger radius in said locking disk and is shorter than the radius of the arcuate edge of larger radius in said stop disk.

5. A rotary valve mechanism having a closed position and two open positions and comprising a casing having an inlet passageway and two outlet passageways therein, a plug rotatably mounted in said casing and operative in one open position to connect said inlet passageway with one of said outlet passageways and in the other open position to connect said inlet passageway with the other of said outlet passageways and in closed position to cut off said inlet passageway from both of said outlet passageways, an outwardly extending axial tubular extension of lesser diameter than the diameter of the outer end of said plug carried by said plug, a pair of diametrically opposite longitudinal slots in said tubular extension, a depressible valve stem having the inner end thereof slidably mounted in said tubular extension, a spring disposed in said tubular extension and operative to yieldingly bias said valve stem outwardly, a transverse medial slot through said valve stem at the inner end thereof, a key pivotally mounted in said medial slot and extending outwardly from opposite sides of said valve stem and into said diametrically opposite slots in said tubular extension to provide a slidable driving connection between said valve stem and said plug with one end of said key extending outwardly beyond the outer wall of said tubular extension, a pair of radially spaced limit stops carried by said casing and cooperating with said pivotally mounted key to prevent the movement of said plug past either outlet position, locking stop means carried by said casing intermediate said limit stops and cooperating with said pivotally mounted key to lock said plug in closed position; and cam means carried by said casing and cooperating with said pivotally mounted key, after said plug has been rotated from closed position toward either open position, to rock said key about its pivot and move an end of said key into position to about said stop means when said plug has been rotated from either open position to closed position.

6. A rotary valve mechanism as defined in claim 5 in which said locking stop means comprises two spaced abutments connected together by an arcuate edge and in which said cam means comprises the surface adjacent said arcuate edge.

7. A rotary valve mechanism having a closed position and two open positions and comprising a casing having an inlet passageway and two outlet passageways therein, a plug rotatably mounted in said casing and operative in one open position to connect said inlet passageway with one of said outlet passageways and in the other open position to connect said inlet passageway with the other of said outlet passageways and in closed position to cut off said inlet passageway from both of said outlet passageways, an outwardly extending axial tubular extension carried by said plug, a pair of diametrically opposite longitudinal slots in said tubular extension, a valve stem having the inner end thereof slidably mounted in said tubular extension, a spring disposed in said tubular extension and operative to yieldingly bias said valve stem outwardly, a transverse medial slot through said valve stem at the inner end thereof, a key pivotally mounted in said slot and extending outwardly from opposite sides of said valve stem and into said diametrically opposite slots in said tubular extension to provide a slidable driving connection between said valve stem and said plug, a stop disk having an aperture therethrough and a pair of spaced radially extending shoulders extending into said aperture secured to said casing about said valve stem and tubular extension, a locking disk having an aperture therethrough and a pair of aligned shoulders therein secured to said casing about said valve stem and in contact with the outer face of said stop disk, said key cooperating with said radially extending shoulders to limit the rotation of said plug to open positions and with said aligned shoulders to lock said plug in closed position, the aperture through said stop disk being defined by two concentric arcuate edges of different radii which are connected together by said radially extending shoulders, and the aperture through said locking disk being defined by two concentric edges of different radii which are connected together by said aligned shoulders.

8. A rotary valve mechanism as defined in claim 7 in which the radius of the arcuate edge of larger radius in said locking disk is substantially the same as the radius of the arcuate edge of smaller radius in said stop disk, and in which the radius of the arcuate edge of smaller radius in said locking disk is substantially the same as the radius of said valve stem.

9. A rotary valve mechanism as defined in claim 8 in which the length of the outer side of said key on each side of the pivotal axis of said key is less than the radius of the arcuate edge of larger radius in said locking disk and is greater than the radius of the arcuate edge of smaller radius in said locking disk, and in which the length of the inner side of said key on one side of the pivoted axis thereof is the same length as the length of the opposing end of the outer side of said key and the length of the inner side of said key on the opposite side of the pivoted axis thereof is longer than the radius of the arcuate edge of larger radius in said locking disk and is shorter than the radius of the arcuate edge of larger radius in said stop disk.

References Cited in the file of this patent

UNITED STATES PATENTS

| | | |
|---|---|---|
| 1,933,177 | Kindl | Oct. 31, 1933 |
| 2,044,254 | Mueller | June 16, 1936 |
| 2,064,623 | Mueller | Dec. 15, 1936 |